(12) United States Patent
Jain et al.

(10) Patent No.: US 10,712,361 B2
(45) Date of Patent: Jul. 14, 2020

(54) MULTIPLE METER DETECTION AND PROCESSING USING MOTION DATA

(71) Applicant: The Nielsen Company (US), LLC, New York, NY (US)

(72) Inventors: Anand Jain, Ellicott City, MD (US); John Stavropoulos, Edison, NJ (US); Alan Neuhauser, Silver Spring, MD (US); Wendell Lynch, East Lansing, MI (US); Vladimir Kuznetsov, Ellicott City, MD (US); Jack Crystal, Owings Mills, MD (US)

(73) Assignee: The Nielsen Company, New York, NY (US)

( * ) Notice: Subject to any disclaimer, the term of this patent is extended or adjusted under 35 U.S.C. 154(b) by 187 days.

(21) Appl. No.: 15/638,799

(22) Filed: Jun. 30, 2017

(65) Prior Publication Data

US 2017/0299624 A1 Oct. 19, 2017

Related U.S. Application Data

(63) Continuation of application No. 13/691,166, filed on Nov. 30, 2012, now Pat. No. 9,696,336, which is a
(Continued)

(51) Int. Cl.
*G06Q 30/02* (2012.01)
*G01P 15/18* (2013.01)
(Continued)

(52) U.S. Cl.
CPC .............. *G01P 15/18* (2013.01); *G01P 15/00* (2013.01); *G06F 17/00* (2013.01); *G06Q 30/02* (2013.01); *G06Q 30/0201* (2013.01)

(58) Field of Classification Search
CPC ...... G01P 15/18; G01P 15/00; G06Q 30/0201; G06Q 30/02; G08B 21/0446
See application file for complete search history.

(56) References Cited

U.S. PATENT DOCUMENTS

| | | | |
|---|---|---|---|
| 2,662,168 A | 12/1953 | Scherbatskoy | |
| 3,919,479 A | 11/1975 | Moon et al. | |

(Continued)

FOREIGN PATENT DOCUMENTS

| | | |
|---|---|---|
| CN | 102053866 | 5/2011 |
| CN | 104520719 | 4/2015 |

(Continued)

OTHER PUBLICATIONS

Canadian Intellectual Property, "Notice of Allowance," issued in connection with Application No. 2,875,354, Sep. 14, 2017, 1 page.
(Continued)

*Primary Examiner* — Toan M Le
(74) *Attorney, Agent, or Firm* — Hanley, Flight & Zimmerman, LLC

(57) ABSTRACT

Systems and methods are disclosed for identifying portable devices carried by the same person. An example method includes receiving media exposure data from one of a plurality of portable computing devices. Receiving segmented accelerometer data from the plurality of portable computing devices. Forming accelerometer classification data for the plurality of portable computing devices based on features extracted from the segmented accelerometer data. Comparing the accelerometer classification data for the first portable computing device to accelerometer classification data for the plurality of portable computing devices, to determine if the accelerometer classification data for the first portable computing device is sufficiently similar to a second portable computing devices. The example method further includes identifying the first and second portable computing
(Continued)

device as being physically carried by a same person when the comparison determines that the accelerometer classification data for the first portable computing device is sufficiently similar to the second computing devices.

17 Claims, 9 Drawing Sheets

Related U.S. Application Data continuation-in-part of application No. 13/307,634, filed on Nov. 30, 2011, now abandoned.

(51) Int. Cl.
*G01P 15/00* (2006.01)
*G06F 17/00* (2019.01)

(56) References Cited

U.S. PATENT DOCUMENTS

| | | |
|---|---|---|
| 4,230,990 A | 10/1980 | Lert, Jr. et al. |
| 4,450,551 A | 5/1984 | Kudo et al. |
| 4,677,466 A | 6/1987 | Lert, Jr. et al. |
| 4,697,209 A | 9/1987 | Kiewit et al. |
| 4,739,398 A | 4/1988 | Thomas et al. |
| 4,843,562 A | 6/1989 | Kenyon et al. |
| 4,918,730 A | 4/1990 | Schulze |
| 4,955,070 A | 9/1990 | Welsh et al. |
| 5,450,490 A | 9/1995 | Jensen et al. |
| 5,512,933 A | 4/1996 | Wheatley et al. |
| 5,574,962 A | 11/1996 | Fardeau et al. |
| 5,579,124 A | 11/1996 | Aijala et al. |
| 5,581,800 A | 12/1996 | Fardeau et al. |
| 5,594,934 A | 1/1997 | Lu et al. |
| 5,612,729 A | 3/1997 | Ellis et al. |
| 5,764,763 A | 6/1998 | Jensen et al. |
| 5,787,334 A | 7/1998 | Fardeau et al. |
| 6,871,180 B1 | 3/2005 | Neuhauser et al. |
| 7,640,141 B2 | 12/2009 | Kolessar et al. |
| 8,040,237 B2 | 10/2011 | Nielsen et al. |
| 8,248,234 B2 | 8/2012 | Nielsen et al. |
| 9,696,336 B2 * | 7/2017 | Jain .................. G01P 15/00 |
| 2004/0010418 A1 | 1/2004 | Buonocore et al. |
| 2005/0035857 A1 | 2/2005 | Zhang |
| 2005/0234774 A1 | 10/2005 | Dupree |
| 2006/0080551 A1 | 4/2006 | Mantyjarvi |
| 2008/0086304 A1 | 4/2008 | Neuhauser |
| 2008/0086533 A1 | 4/2008 | Neuhauser et al. |
| 2008/0091087 A1 | 4/2008 | Neuhauser |
| 2008/0091451 A1 | 4/2008 | Crystal |
| 2008/0091762 A1 | 4/2008 | Neuhaser et al. |
| 2008/0109295 A1 | 5/2008 | McConochie et al. |
| 2009/0070797 A1 | 3/2009 | Ramaswamy et al. |
| 2009/0132197 A1 | 5/2009 | Rubin et al. |
| 2009/0171616 A1 | 7/2009 | Zhang et al. |
| 2010/0077420 A1 | 3/2010 | Nielsen et al. |
| 2010/0235527 A1 | 9/2010 | Pelton et al. |
| 2011/0106587 A1 | 5/2011 | Lynch et al. |
| 2012/0245978 A1 | 9/2012 | Jain et al. |
| 2012/0278377 A1 | 11/2012 | Weismann et al. |
| 2013/0138386 A1 | 5/2013 | Jain et al. |
| 2013/0138388 A1 | 5/2013 | Jain et al. |

FOREIGN PATENT DOCUMENTS

| | | |
|---|---|---|
| EP | 0887958 | 12/1998 |
| WO | 9111062 | 7/1991 |
| WO | 0211123 | 2/2002 |
| WO | 2006030065 | 3/2006 |

OTHER PUBLICATIONS

Ailisto et al., "Identifying People from Gait Pattern with Accelerometers," Apr. 1, 2006, 12 pages, VTT Electronics. (Document available in Parent U.S. Appl. No. 13/691,166.).

Derawi et al., "International Conference on Intelligent Information hiding and Multimedia Signal Processing—Special Session on Advances in Biometrics," 2010. (Document available in Parent U.S. Appl. No. 13/691,166.).

Mantyjarvi et al., "Identifying Users of Portable Devices from Gait Pattern with Accelerometers," 2005, 4 pages, VTT Electronics, Finland. (Document available in Parent U.S. Appl. No. 13/691,166.).

Sprager et al., "Gait Identification Using Cumulants of Accelerometer Data," 2009, 6 pages, System Software Laboratory, University of Maribor, Slovenia. (Document available in Parent U.S. Appl. No. 13/691,166.).

International Search Report and Written Opinion in International Application No. PCT/US2012/067054 dated Feb. 6, 2013. (Document available in Parent U.S. Appl. No. 13/691,166.).

United States Patent and Trademark Office, "Non-Final Office Action," issued in connection with U.S. Appl. No. 13/307,634, dated Apr. 15, 2014, 18 pages. (Document available in Parent U.S. Appl. No. 13/691,166.).

Patent Cooperation Treaty, "International Search Report," issued in connection with Application No. PCT/US2013/054501, dated Jan. 29, 2014, 2 pages. (Document available in Parent U.S. Appl. No. 13/691,166.).

Patent Cooperation Treaty, "Written Opinion of the International Searching Authority," issued in connection with Application No. PCT/US2013/054501, dated Jan. 29, 2014, 6 pages. (Document available in Parent U.S. Appl. No. 13/691,166.).

Sprager et al. A Cumulant-Based Method for Gait Identification Using Accelerometer Data with Principal Component Analysis and Support Vector Machine. 2000. [retrieved on Jan. 20, 2014]. Retrieved from the Internet:<URL: http://www.wseas.us/e-library/transactions/signal/2009/89-152.pdf>. entire document. (Document available in Parent U.S. Appl. No. 13/691,166.).

Nowlan. Human Identification via Gait Recognition Using Accelerometer Gyro Forces. 2009. [retrieved on Jan. 20, 2014]. Retrieved from the Internet:<URL: http://cs-www .cs. yale .edu/homes/mfn3/pub/mfn_gait_id .pdf>. entire document. (Document available in Parent U.S. Appl. No. 13/691,166.).

Derawi et al. "Improved Cycle Detection for Accelerometer Based Gait Authentication," International Conference on Intelligent Information Hiding and Multimedia signal Processing—Special Session on Advances in Biometrics. Oct. 2010, 6 pages. (Document available in Parent U.S. Appl. No. 13/691,166.).

Patent Cooperation Treaty, "International Preliminary Report on Patentability," issued in connection with Application No. PCT/US2012/067054, dated Jun. 3, 2014, 9 pages. (Document available in Parent U.S. Appl. No. 13/691,166.).

United States Patent and Trademark Office, "Non-Final Office Action," issued in connection with U.S. Appl. No. 13/307,634, dated Sep. 22, 2014, 24 pages. (Document available in Parent U.S. Appl. No. 13/691,166.).

United States Patent and Trademark Office, "Final Office Action," issued in connection with U.S. Appl. No. 13/307,634, dated Apr. 6, 2015, 21 pages. (Document available in Parent U.S. Appl. No. 13/691,166.).

Patent Cooperation Treaty, "International Preliminary Report on Patentability," issued in connection with Application No. PCT/US2013/054501, dated Jun. 2, 2015, 8 pages. (Document available in Parent U.S. Appl. No. 13/691,166.).

European Patent Office, "Communication pursuant to Rules 161(2) and 162 EPC," issued in connection with Application No. 13859416.3, dated Jul. 7, 2015, 2 pages. (Document available in Parent U.S. Appl. No. 13/691,166.).

United States Patent and Trademark Office, "Non-Final Office Action," issued in connection with U.S. Appl. No. 13/691,166, dated Sep. 15, 2015, 33 pages. (Document available in Parent U.S. Appl. No. 13/691,166.).

(56) References Cited

OTHER PUBLICATIONS

Kwapisz et al., "Cell Phone-Based Biometric Identification," 2010, 7 pages. (Document available in Parent U.S. Appl. No. 13/691,166.).

Canadian Intellectual Property, "Office Action," issued in connection with Application No. 2,875,354, dated Mar. 1, 2016, 4 pages. (Document available in Parent U.S. Appl. No. 13/691,166.).

The State Intellectual Property Office, "Office Action," issued in connection with Application No. 201380029270.9, dated Feb. 14, 2016, 21 pages. (Document available in Parent U.S. Appl. No. 13/691,166.).

United States Patent and Trademark Office, "Final Office Action," issued in connection with U.S. Appl. No. 13/691,166, dated Mar. 14, 2016, 16 pages. (Document available in Parent U.S. Appl. No. 13/691,166.).

European Patent Office, "Extended Search Report," issued in connection with Application No. 13859416.3, dated Jul. 1, 2016, 12 pages. (Document available in Parent U.S. Appl. No. 13/691,166.).

European Patent Office, "Supplemental Search Report," issued in connection with Application No. 13859416.3, dated Jul. 19, 2016, 1 page. (Document available in Parent U.S. Appl. No. 13/691,166.).

The State Intellectual Property Office of China, "Office Action," issued in connection with Application No. 201380029270.9, dated Sep. 28, 2016, pages. (Document available in Parent U.S. Appl. No. 13/691,166.).

United States Patent and Trademark Office, "Notice of Allowance," issued in connection with U.S. Appl. No. 13/691,166, dated Mar. 1, 2017, 8 pages. (Document available in Parent U.S. Appl. No. 13/691,166.).

State Intellecutal Property Office of China, "Notice of Allowance," issued in connection with application No. 201380029270.9 dated Sep. 22, 2017, 5 pages.

European Patent Office, "First Examination Report," issued in connection with Application No. 13859416.3, dated Jun. 8, 2017, 11 pages.

Ossowska, Alicja, "One-bit Quantization for Synthetic Aperture Radar with DBF," Conference: EUSAR 2008—7th European Conference on Synthetic Aperture Radar Jun. 2, 2008-Jun. 5, 2008 at Friedrichshafen, Germany, 1 page. Abstract only provided).

European Patent Office, "Summons to attend oral proceedings pursuant to Rule 115(1) EPC," issued in connection with European Patent Application No. 13859416.3, dated Mar. 22, 2018, 14 pages.

Gafurov et al., "Biometric Gait Authentication Using Accelerometer Sensor," Journal of Computers, vol. 1, No. 7, 2006, 9 pages.

European Patent Office, "European Search Report," issued in connection with European Patent Application No. 19180491.3, dated Jul. 23, 2019, 12 pages.

Lester et al, "Are you with me?—Using Accelerometers to Determine if Two Devices Are Carried by the Same Person," Proceedings of Pervasive, Intel Research Seattle, 2004, 18 pages.

The State Intellectual Property Office, "Office Action," issued in connection with Application No. 201380029270.9, dated Mar. 15, 2017, 10 pages (original document and translation).

United States Patent and Trademark Office, "Notice of Allowance," dated Mar. 1, 2017 in connection with U.S. Appl. No. 13/691,166, 8 pages.

United States Patent and Trademark Office, "Notice of Allowance," dated Apr. 20, 2017 in connection with U.S. Appl. No. 13/691,166, 4 pages.

* cited by examiner

| User ID | 11:00 | 11:05 | 11:10 | 11:15 | 11:20 | 11:25 | 11:30 |
|---|---|---|---|---|---|---|---|
| User 1 | FW2 | FW2 | FW1 | S1 | S1 | S2 | S1 |
| User 2 | S1 | S1 | S1 | S1 | S1 | L1 | L2 |
| User 3 | R2 | FW1 | S1 | S1 | SW1 | S1 | S1 |
| User 4 | R1 | SW1 | S1 | SW1 | SW1 | SW2 | S1 |

R = running (types 1 & 2)
FW = Fast Walk (types 1, 2)
SW = Slow Walk (types 1 & 2)
S = Sitting (types 1 & 2)
L = Laying (types 1 & 2)

▇▇▇ = heavy motion
▇▇▇ = medium motion
▇ = light/no motion

FIG. 7

MULTIPLE METER DETECTION AND PROCESSING USING MOTION DATA

RELATED APPLICATIONS

This patent arises from a continuation of U.S. patent application Ser. No. 13/691,166, filed Nov. 30, 2012, now U.S. Pat. No. 9,696,336, which is a continuation-in-part of U.S. patent application Ser. No. 13/307,634, titled "Movement/Position Monitoring And Linking To Media Consumption" to Jain et al., filed Nov. 30, 2011, now abandoned. The contents of U.S. patent application Ser. Nos. 13/307,634 and 13/691,166 are hereby incorporated by reference in their entirety herein.

TECHNICAL FIELD

The present disclosure is directed to audience measurement technology. More specifically, the disclosure is related to monitoring personal meter devices to determine motion activity relating to media exposure and to detect individuals or panelists that may be carrying multiple meters on their person.

BACKGROUND INFORMATION

The recent surge in popularity of portable phones, laptops, PDAs, and tablet-based computer processing devices, such as the iPad™, Xoom™, Galaxy Tab™ and Playbook™ has spurred new dimensions of personal computing. Often referred to a "portable computing devices," these devices often include interfaces, such as touch screens, miniature/portable keyboards and other peripherals that allow users to input and receive data just as they would on stationary personal computers (PC). One aspect of portable computing devices that has received recent attention is the use of accelerometers in portable computing devices. Generally speaking, an accelerometer is a sensor that measures acceleration of a device, where the acceleration is attributed either to motion or gravity. Acceleration can be generated using static forces such as a constant force of gravity, or dynamic forces such as moving or vibrating a device.

One example of includes the LIS331DL 3-axis accelerometer manufactured by STMicroelectronics, which is a small, low-power linear accelerometer. The device features digital I²C/SPI serial interface standard output and smart embedded functions. The sensing element, capable of detecting the acceleration, is manufactured to produce inertial sensors and actuators in silicon. The IC interface is manufactured using a CMOS process that provides a dedicated circuit which is trimmed to better match the sensing element characteristics. The LIS331DL has dynamically user selectable full scales of ±2 g/±8 g and it is capable of measuring accelerations with an output data rate of 100 Hz or 400 Hz. Those skilled in the art recognize that the above is only one example and that a multitude of other accelerometers from various manufacturers are suitable for the present disclosure.

Accelerometers, and in some cases magnetometers, are becoming widely accepted as a useful tool for measuring human motion in relation to a portable computing device. Accelerometers offer several advantages in monitoring of human movement, in that the response to both frequency and intensity of movement makes them superior to actometers or pedometers. Also, accelerometers do not require the computing power of the portable computing device in the sensing process. The piezoelectric or MEMS (Micro-Electromechanical System) sensors in accelerometers are actually sensing movement accelerations and the magnitude of gravitational field.

Portable computing devices are also becoming popular candidates for audience measurement purposes. In addition to measuring on-line media usage, such as web pages, programs and files, portable computing devices are particularly suited for surveys and questionnaires. Furthermore, by utilizing specialized microphones, portable computing devices may be used for monitoring user exposure to media data, such as radio and television broadcasts, streaming audio and/or video, billboards, products, and so on. Some examples of such applications are described in U.S. patent application Ser. No. 12/246,225, titled "Gathering Research Data" to Joan Fitzgerald et al., U.S. patent application Ser. No. 11/643,128, titled "Methods and Systems for Conducting Research Operations" to Gopalakrishnan et al., and U.S. patent application Ser. No. 11/643,360, titled "Methods and Systems for Conducting Research Operations" to Flanagan, III et al., each of which are assigned to the assignee of the present application and are incorporated by reference in their entirety herein.

One area of audience measurement in the area of portable computing devices requiring improvement is the area of user identification, particularly in the area of portable computing devices equipped with accelerometers. What are needed are systems and methods that allow a portable computing device to collect and process accelerometer data to allow recognition of a particular user, and to register physical activity (or inactivity) associated with a user when media exposure (e.g., viewing web page, viewing or listening to a broadcast or streaming media) is taking place. To accomplish this, accelerometer profiles are needed that uniquely identifies each user and certain physical activity. Additionally, the accelerometer profiles may be used to determine if a non-registered person is using the device at a particular time. Such configurations are advantageous in that they provide a non-intrusive means for identifying users according to their physical activity, inactivity or a combination of both, instead of relying on data inputs provided by a user at the beginning of a media session, which may or may not correlate to the user actually using the device.

Additionally, accelerometer data may be useful in detecting device compliance to determine if users or panelists are correctly using portable metering devices and/or if multiple devices are being carried. Often times, users and/or panelists can carry multiple devices, which may lead to inaccurate media measurement results. It would be advantageous to use accelerometer data to identify such phenomena when they occur.

SUMMARY

Under certain embodiments, computer-implemented methods and systems are disclosed for processing data in a tangible medium to identify users and activities from physical characteristics obtained from sensor data in a portable computing device, such as an accelerometer, and associate the identification data and physical activity with media exposure data. Media exposure data may be derived from media received externally from the device, such as radio and/or television broadcasts, or streaming media played on another device (such as a computer). The media exposure data may be extracted from ancillary codes embedded into an audio portion of the media, or audio signatures extracted from the audio. Media exposure data may also be derived from media generated internally on the device, such as web pages, software applications, media applications, and media played on the device itself.

Raw data collected from the accelerometer during a training session is processed and segmented for feature extraction, where the features are used to classify the accelerometer data as a physical activity for a user profile. During a media session, the portable computing device collects media exposure data, while at the same time, collects data from the accelerometer and compares it to the user profile. The comparison authenticates the user and determines the physical activity the user is engaged in. Additional data may be collected from the portable computing device to determine one or more operational conditions of the device itself. In addition, accelerometer readings from multiple devices may be compared to determine is one person is carrying multiple devices.

BRIEF DESCRIPTION OF THE DRAWINGS

The present invention is illustrated by way of example and not limitation in the figures of the accompanying drawings, in which like references indicate similar elements and in which:

FIG. 5A is an exemplary report generated using the configuration exemplified in FIG. 5;

FIG. 7 is an exemplary illustration showing a probabilistic determination of the identity of a user that is most likely to have been exposed to a media event based on monitored accelerometer data;

DETAILED DESCRIPTION

Figure 1:
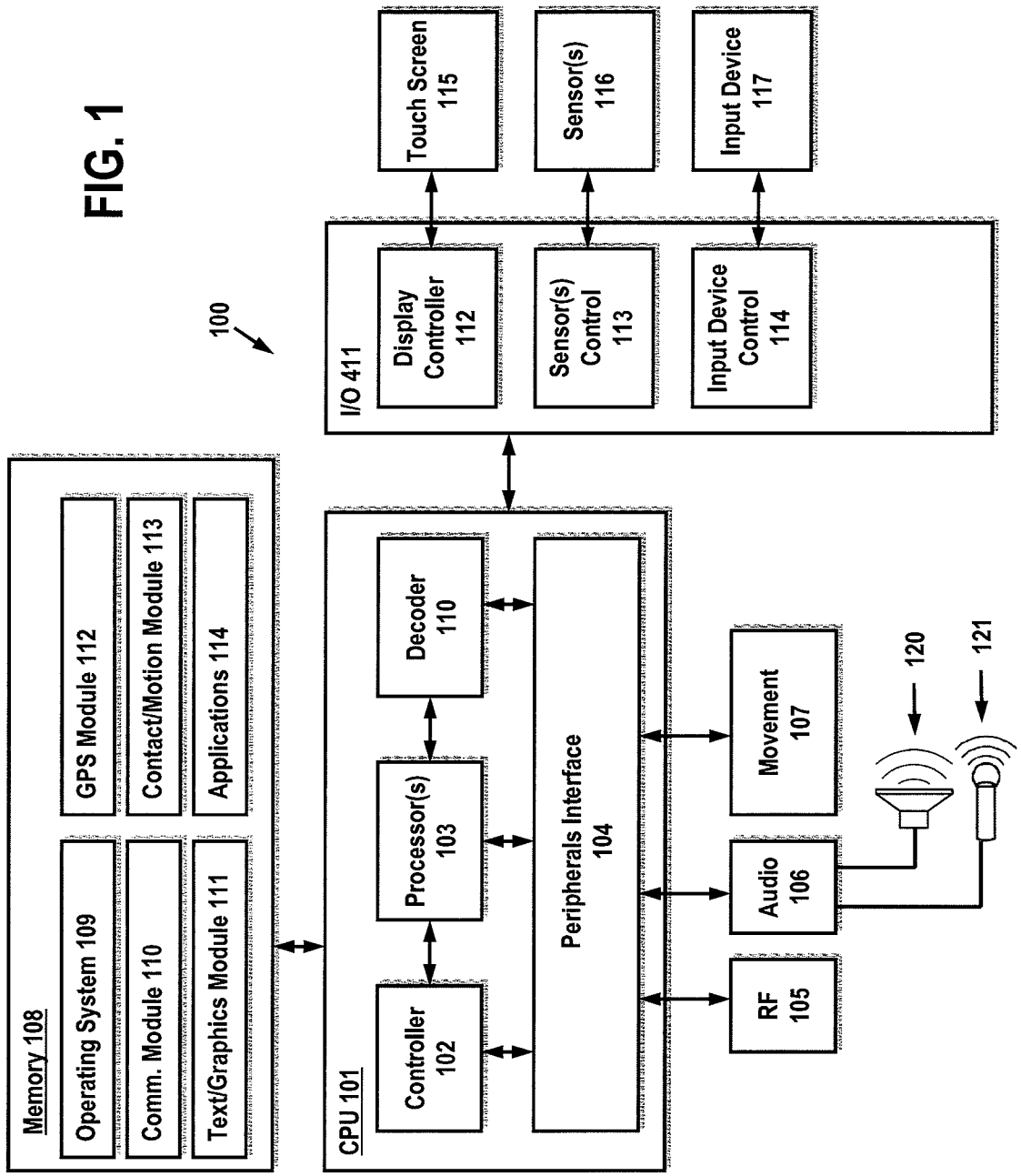
FIG. 1 is an exemplary portable computing device configured to register accelerometer data, data usage and/or media exposure under an exemplary embodiment.

FIG. 1 is an exemplary embodiment of a portable computing device 100, which may be a smart phone, tablet computer, or the like. Device 100 may include a central processing unit (CPU) 101 (which may include one or more computer readable storage mediums), a memory controller 102, one or more processors 103, a peripherals interface 104, RF circuitry 105, audio circuitry 106, a speaker 120, a microphone 120, and an input/output (I/O) subsystem 111 having display controller 112, control circuitry for one or more sensors 113 and input device control 114. These components may communicate over one or more communication buses or signal lines in device 100. It should be appreciated that device 100 is only one example of a portable multifunction device 100, and that device 100 may have more or fewer components than shown, may combine two or more components, or a may have a different configuration or arrangement of the components. The various components shown in FIG. 1 may be implemented in hardware, software or a combination of hardware and software, including one or more signal processing and/or application specific integrated circuits.

Decoder 110 serves to decode ancillary data embedded in audio signals in order to detect exposure to media. Examples of techniques for encoding and decoding such ancillary data are disclosed in U.S. Pat. No. 6,871,180, titled "Decoding of Information in Audio Signals," issued Mar. 22, 2005, which is assigned to the assignee of the present application, and is incorporated by reference in its entirety herein. Other suitable techniques for encoding data in audio data are disclosed in U.S. Pat. No. 7,640,141 to Ronald S. Kolessar and U.S. Pat. No. 5,764,763 to James M. Jensen, et al., which are also assigned to the assignee of the present application, and which are incorporated by reference in their entirety herein. Other appropriate encoding techniques are disclosed in U.S. Pat. No. 5,579,124 to Aijala, et al., U.S. Pat. Nos. 5,574,962, 5,581,800 and 5,787,334 to Fardeau, et al., and U.S. Pat. No. 5,450,490 to Jensen, et al., each of which is assigned to the assignee of the present application and all of which are incorporated herein by reference in their entirety.

An audio signal which may be encoded with a plurality of code symbols is received at microphone 121, or via a direct link through audio circuitry 106. The received audio signal may be from streaming media, broadcast, otherwise communicated signal, or a signal reproduced from storage in a device. It may be a direct coupled or an acoustically coupled signal. From the following description in connection with the accompanying drawings, it will be appreciated that decoder 110 is capable of detecting codes in addition to those arranged in the formats disclosed hereinabove.

For received audio signals in the time domain, decoder 110 transforms such signals to the frequency domain preferably through a fast Fourier transform (FFT) although a direct cosine transform, a chirp transform or a Winograd transform algorithm (WFTA) may be employed in the alternative. Any other time-to-frequency-domain transformation function providing the necessary resolution may be employed in place of these. It will be appreciated that in certain implementations, transformation may also be carried out by filters, by an application specific integrated circuit, or any other suitable device or combination of devices. The decoding may also be implemented by one or more devices which also implement one or more of the remaining functions illustrated in FIG. 1.

The frequency domain-converted audio signals are processed in a symbol values derivation function to produce a stream of symbol values for each code symbol included in the received audio signal. The produced symbol values may represent, for example, signal energy, power, sound pressure level, amplitude, etc., measured instantaneously or over a period of time, on an absolute or relative scale, and may be expressed as a single value or as multiple values. Where the symbols are encoded as groups of single frequency components each having a predetermined frequency, the symbol values preferably represent either single frequency component values or one or more values based on single frequency component values.

The streams of symbol values are accumulated over time in an appropriate storage device (e.g., memory 108) on a symbol-by-symbol basis. This configuration is advantageous for use in decoding encoded symbols which repeat periodically, by periodically accumulating symbol values for the various possible symbols. For example, if a given symbol is expected to recur every X seconds, a stream of symbol values may be stored for a period of nX seconds (n>1), and added to the stored values of one or more symbol value streams of nX seconds duration, so that peak symbol values accumulate over time, improving the signal-to-noise ratio of the stored values. The accumulated symbol values are then examined to detect the presence of an encoded message wherein a detected message is output as a result. This function can be carried out by matching the stored accumulated values or a processed version of such values, against stored patterns, whether by correlation or by another pattern matching technique. However, this process is preferably carried out by examining peak accumulated symbol values and their relative timing, to reconstruct their encoded message. This process may be carried out after the first stream of symbol values has been stored and/or after each subsequent stream has been added thereto, so that the message is detected once the signal-to-noise ratios of the stored, accumulated streams of symbol values reveal a valid message pattern.

Alternately or in addition, processor(s) 103 can processes the frequency-domain audio data to extract a signature therefrom, i.e., data expressing information inherent to an audio signal, for use in identifying the audio signal or obtaining other information concerning the audio signal (such as a source or distribution path thereof). Suitable techniques for extracting signatures include those disclosed in U.S. Pat. No. 5,612,729 to Ellis, et al. and in U.S. Pat. No. 4,739,398 to Thomas, et al., each of which is assigned to the assignee of the present application and both of which are incorporated herein by reference in their entireties. Still other suitable techniques are the subject of U.S. Pat. No. 2,662,168 to Scherbatskoy, U.S. Pat. No. 3,919,479 to Moon, et al., U.S. Pat. No. 4,697,209 to Kiewit, et al., U.S. Pat. No. 4,677,466 to Lert, et al., U.S. Pat. No. 5,512,933 to Wheatley, et al., U.S. Pat. No. 4,955,070 to Welsh, et al., U.S. Pat. No. 4,918,730 to Schulze, U.S. Pat. No. 4,843,562 to Kenyon, et al., U.S. Pat. No. 4,450,551 to Kenyon, et al., U.S. Pat. No. 4,230,990 to Lert, et al., U.S. Pat. No. 5,594,934 to Lu, et al., European Published Patent Application EP 0887958 to Bichsel, PCT Publication WO02/11123 to Wang, et al. and PCT publication WO91/11062 to Young, et al., all of which are incorporated herein by reference in their entireties. As discussed above, the code detection and/or signature extraction serve to identify and determine media exposure for the user of device 400.

Memory 108 may include high-speed random access memory (RAM) and may also include non-volatile memory, such as one or more magnetic disk storage devices, flash memory devices, or other non-volatile solid-state memory devices. Access to memory 108 by other components of the device 100, such as processor 103, decoder 110 and peripherals interface 104, may be controlled by the memory controller 102. Peripherals interface 104 couples the input and output peripherals of the device to the processor 103 and memory 108. The one or more processors 103 run or execute various software programs and/or sets of instructions stored in memory 108 to perform various functions for the device 100 and to process data. In some embodiments, the peripherals interface 104, processor(s) 103, decoder 110 and memory controller 102 may be implemented on a single chip, such as a chip 101. In some other embodiments, they may be implemented on separate chips.

The RF (radio frequency) circuitry 105 receives and sends RF signals, also called electromagnetic signals. The RF circuitry 105 converts electrical signals to/from electromagnetic signals and communicates with communications networks and other communications devices via the electromagnetic signals. The RF circuitry 105 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 105 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

Audio circuitry 106, speaker 120, and microphone 121 provide an audio interface between a user and the device 100. Audio circuitry 106 may receive audio data from the peripherals interface 104, converts the audio data to an electrical signal, and transmits the electrical signal to speaker 120. The speaker 120 converts the electrical signal to human-audible sound waves. Audio circuitry 106 also receives electrical signals converted by the microphone 121 from sound waves, which may include encoded audio, described above. The audio circuitry 106 converts the electrical signal to audio data and transmits the audio data to the peripherals interface 104 for processing. Audio data may be retrieved from and/or transmitted to memory 408 and/or the RF circuitry 105 by peripherals interface 104. In some embodiments, audio circuitry 106 also includes a headset jack for providing an interface between the audio circuitry 106 and removable audio input/output peripherals, such as output-only headphones or a headset with both output (e.g., a headphone for one or both ears) and input (e.g., a microphone).

I/O subsystem 111 couples input/output peripherals on the device 100, such as touch screen 115 and other input/control devices 117, to the peripherals interface 104. The I/O subsystem 111 may include a display controller 112 and one or more input controllers 114 for other input or control devices. The one or more input controllers 114 receive/send electrical signals from/to other input or control devices 117. The other input/control devices 117 may include physical buttons (e.g., push buttons, rocker buttons, etc.), dials, slider switches, joysticks, click wheels, and so forth. In some alternate embodiments, input controller(s) 114 may be coupled to any (or none) of the following: a keyboard, infrared port, USB port, and a pointer device such as a mouse, an up/down button for volume control of the speaker 120 and/or the microphone 121. Touch screen 115 may also be used to implement virtual or soft buttons and one or more soft keyboards.

Touch screen 115 provides an input interface and an output interface between the device and a user. The display controller 112 receives and/or sends electrical signals from/ to the touch screen 115. Touch screen 115 displays visual output to the user. The visual output may include graphics, text, icons, video, and any combination thereof (collectively termed "graphics"). In some embodiments, some or all of the visual output may correspond to user-interface objects, further details of which are described below. As describe above, touch screen 115 has a touch-sensitive surface, sensor or set of sensors that accepts input from the user based on haptic and/or tactile contact. Touch screen 115 and display controller 112 (along with any associated modules and/or sets of instructions in memory 108) detect contact (and any movement or breaking of the contact) on the touch screen 115 and converts the detected contact into interaction with user-interface objects (e.g., one or more soft keys, icons, web pages or images) that are displayed on the touch screen. In an exemplary embodiment, a point of contact between a touch screen 115 and the user corresponds to a finger of the user. Touch screen 115 may use LCD (liquid crystal display) technology, or LPD (light emitting polymer display) technology, although other display technologies may be used in other embodiments. Touch screen 115 and display controller 112 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

Device 100 may also include one or more sensors 116 such as optical sensors that comprise charge-coupled device (CCD) or complementary metal-oxide semiconductor (CMOS) phototransistors. The optical sensor may capture still images or video, where the sensor is operated in conjunction with touch screen display 115.

Device 100 may also include one or more accelerometers 107, which may be operatively coupled to peripherals interface 104. Alternately, the accelerometer 107 may be coupled to an input controller 114 in the I/O subsystem 111. As will be discussed in greater detail below, the accelerometer is configured to output accelerometer data in the x, y, and z axes. Preferably, the raw accelerometer data is output to the device's Application Programming Interface (API) stored in memory 108 for further processing.

In some embodiments, the software components stored in memory 108 may include an operating system 109, a communication module 110, a contact/motion module 113, a text/graphics module 111, a Global Positioning System (GPS) module 112, and applications 114. Operating system 109 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components. Communication module 110 facilitates communication with other devices over one or more external ports and also includes various software components for handling data received by the RF circuitry 105. An external port (e.g., Universal Serial Bus (USB), Firewire, etc.) may be provided and adapted for coupling directly to other devices or indirectly over a network (e.g., the Internet, wireless LAN, etc.

Contact/motion module 113 may detect contact with the touch screen 115 (in conjunction with the display controller 112) and other touch sensitive devices (e.g., a touchpad or physical click wheel). The contact/motion module 113 includes various software components for performing various operations related to detection of contact, such as determining if contact has occurred, determining if there is movement of the contact and tracking the movement across the touch screen 115, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 113 and the display controller 112 also detects contact on a touchpad.

Text/graphics module 111 includes various known software components for rendering and displaying graphics on the touch screen 115, including components for changing the intensity of graphics that are displayed. As used herein, the term "graphics" includes any object that can be displayed to a user, including without limitation text, web pages, icons (such as user-interface objects including soft keys), digital images, videos, animations and the like. Additionally, soft keyboards may be provided for entering text in various applications requiring text input. GPS module 112 determines the location of the device and provides this information for use in various applications. Applications 114 may include various modules, including address books/contact list, email, instant messaging, video conferencing, media player, widgets, instant messaging, camera/image management, and the like. Examples of other applications include word processing applications, JAVA-enabled applications, encryption, digital rights management, voice recognition, and voice replication.

Figure 2:
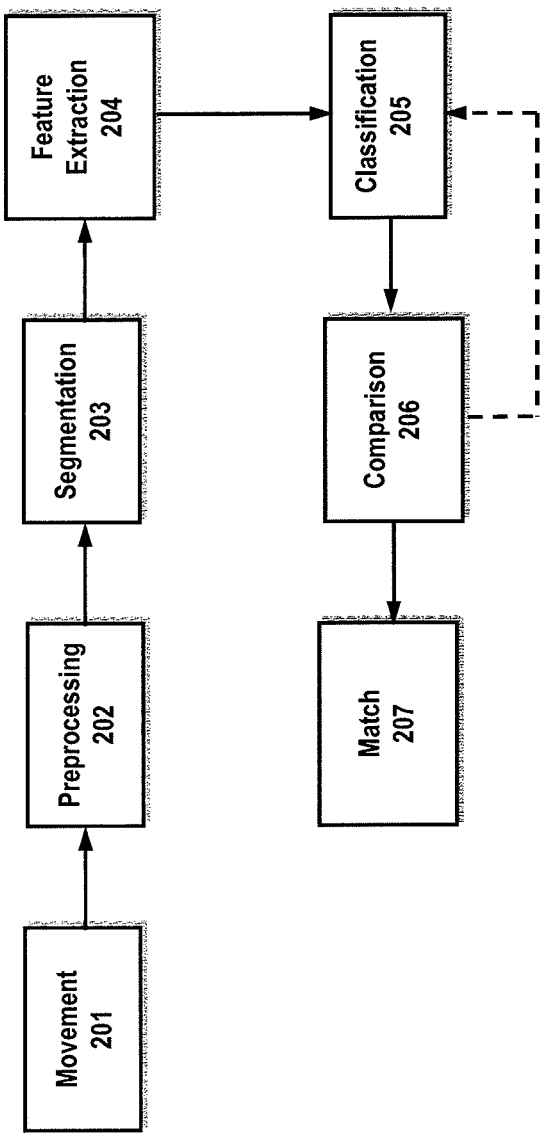
FIG. 2 illustrates an exemplary process by which accelerometer data is processed to determine user characteristic and/or activity.

Turning to FIG. 2, an exemplary process is disclosed for acquiring and processing accelerometer data. Raw accelerometer data 201 from the x, y and/or z axes are output from an accelerometer and are subject to preprocessing in 202. Typically, accelerometers are asynchronous in that they output different sample-rates per time unit. Preprocessing 202 applies interpolation to the incoming accelerometer data to generate regular sampling intervals needed for signal processing. Also, preprocessing can address low-frequency components that are sometimes found in measured acceleration signals. In this manner, preprocessing 202 transforms the raw data into a more desired form from which useful features can be extracted. When time interpolation is applied, a linear interpolation process is preferably used. When frequency noise filtering is used, wavelet transforms (Daubechies wavelet) or weighted moving averages may be used.

Under a preferred embodiment, data analysis is performed as part of preprocessing 202 or segmentation 203 in order to determine a profile or "template" for the accelerometer data. Here, a feature template vector is initially computed and stored as a profile representing characteristics of the movement pertaining to the accelerometer data. The feature template vector may then be used for subsequent comparisons for later-acquired accelerometer data to authenticate the movement relative to a particular user. The accelerometer data can be analyzed in the time domain or frequency domain. For time-domain analysis, a physical characteristic can be determined from the three acceleration signals (x, y, z) changing over time (t). For frequency-domain analysis, a physical characteristic can be determined each frequency over a given range of frequency bands. A given function or signal can also be converted between the time and frequency domains using transformations, discussed in more detail below.

During the segmentation step 203, accelerometer data is analyzed to identify boundaries in the signal to determine singular (e.g., sitting, stopping) or cyclical (e.g., walking, running) events. Preferably, the segmentation is based on one or more peaks in the accelerometer data. Under one embodiment, a combined (x, y, z) accelerometer signal $C_i$ is used to determine segments and/or cycles, based on $$C_i = \sin^{-1}\left(\frac{z}{\sqrt{x_i^2 + y_i^2 + z_i^2}}\right), i = 1 \ldots k$$

where $x_i$, $y_i$, $z_i$, and $C_i$, are forward-backward, sideways, vertical and combined acceleration at the measurement number i, and wherein k is the number of recorded measurements in a signal. Thus, in an instance where a user is walking, the combined gait signal is the angle between the resultant signal ($\sqrt{x_i^2+y_i^2+z_i^2}$) and the sideways axis (z). A gait cycle could be determined, for example, from the beginning moment when one foot touches the ground, and the ending moment when the same foot touches the ground again. Segmentation cycles may be calculated utilizing a 1-or-2 step extraction in a cycle detection algorithm, or through a given period of a periodic gait cycle.

Feature extraction 204 is derived from the data analysis 202 and segmentation 203, where accelerometer data feature extraction may be done in the time domain or frequency domain. For time domain extractions, an "average cycle" method may be used to average all cycles extracted. Alternately, "matrix with cycles," "n-bin normalized histogram," or "cumulants of different orders" methods may be used as well. Details regarding these feature-extraction techniques can be found in Heikki J. Ailisto et al., "Identifying People From Gait Pattern With Accelerometers," *Proceedings of the SPIE*, 5779:7-14, 2005, Mohammad O. Derawi et al., "International Conference on Intelligent Information hiding and Multimedia Signal Processing—Special Session on Advances in Biometrics," 2010, J. Mantyjarvi et al., "Identifying Users of Portable Devices from Gait Pattern With Accelerometers," *IEEE International Conference on Acoustics, Speech and Signal Processing* (ICASSP '05), 2:ii/973-ii/976, 2005, and Sebastian Sprager et al., "Gait Identification Using Cumulants of Accelerometer Data," Proceedings of the $2^{nd}$ WSEAS International Conference on Sensors, and Signals and Visualization, imaging and Simulation and Materials Science," pp. 94-99, Stevens Point, Wis., USA 2009 (WSEAS).

For frequency-domain extractions, a transform is performed on the accelerometer data to convert it into the frequency domain (and vice-versa, if necessary). Exemplary transformations include discrete fourier transform (DFT), fast fourier transform (FFT), discrete cosine transform (DCT), discrete wavelet transform (DWT) and wavelet packet decomposition. (WPD). Using any of the time or frequency-based techniques described above, specific features may be chosen for extraction. Under one embodiment, the fundamental frequencies of the signal are found from the Fourier Transformation of the signal over the sample window. The final value for analysis could be the average of the three dominant frequencies of the signal. In another embodiment, the arithmetic average of the acceleration values in the sample window are used. Alternately, the maximum or minimum value of the signal in the window can be used. Still other features, such as mean value, start-to-end amplitude, standard deviation, peak-to-peak amplitude, root mean square (RMS), morphology, inter quartile range (IQR), peak-to-peak width/length(x) are suitable as well.

Classification 205 is used on extracted features to create a profile or template for accelerometer data for a user of a portable computing device. An initial profile is preferably created during a "training" period where the accelerometer registers various predetermined physical acts from a user. The training data includes input objects extracted from the accelerometer signals. A function relating to the profile can be a continuous value (regressive) or can predict a class label on the input (feature vector) for classification. Various classification metrics may be used for this purpose, including (1) support vector machine (SVM), or similar non-probabilistic binary linear classifiers, (2) principal component analysis (PCA), or similar orthogonal linear transformation-based processes, (3) linear discriminant analysis (LDA) and/or (4) self-organizing maps, such as a Kohonen map (KSOM). Once a one or more profiles are created from the training period, the profiles are used for subsequent comparison processing. In one embodiment, multiple classification metrics are used to form multiple profiles for the same accelerometer data.

For comparison processing 206, a comparison function is preferably applied for comparing feature vectors to each other, such as a distance metric function that defines distances between elements of a set. Suitable comparison metrics for this purpose include cross-correlation, absolute Manhattan distance, Euclidean distance, and/or dynamic time warping (DTW). If the results of comparison processing 206 meet or exceed a predetermined threshold, a match 207 is made. If a match cannot be made, the comparison processing 206 can load a different profile created from a different classification metric from 205 to perform a new comparison. This process can repeat until a match is made. If no match is found, the data may be discarded or stored for possible re-classification as a new physical event or new user.

Figure 3:
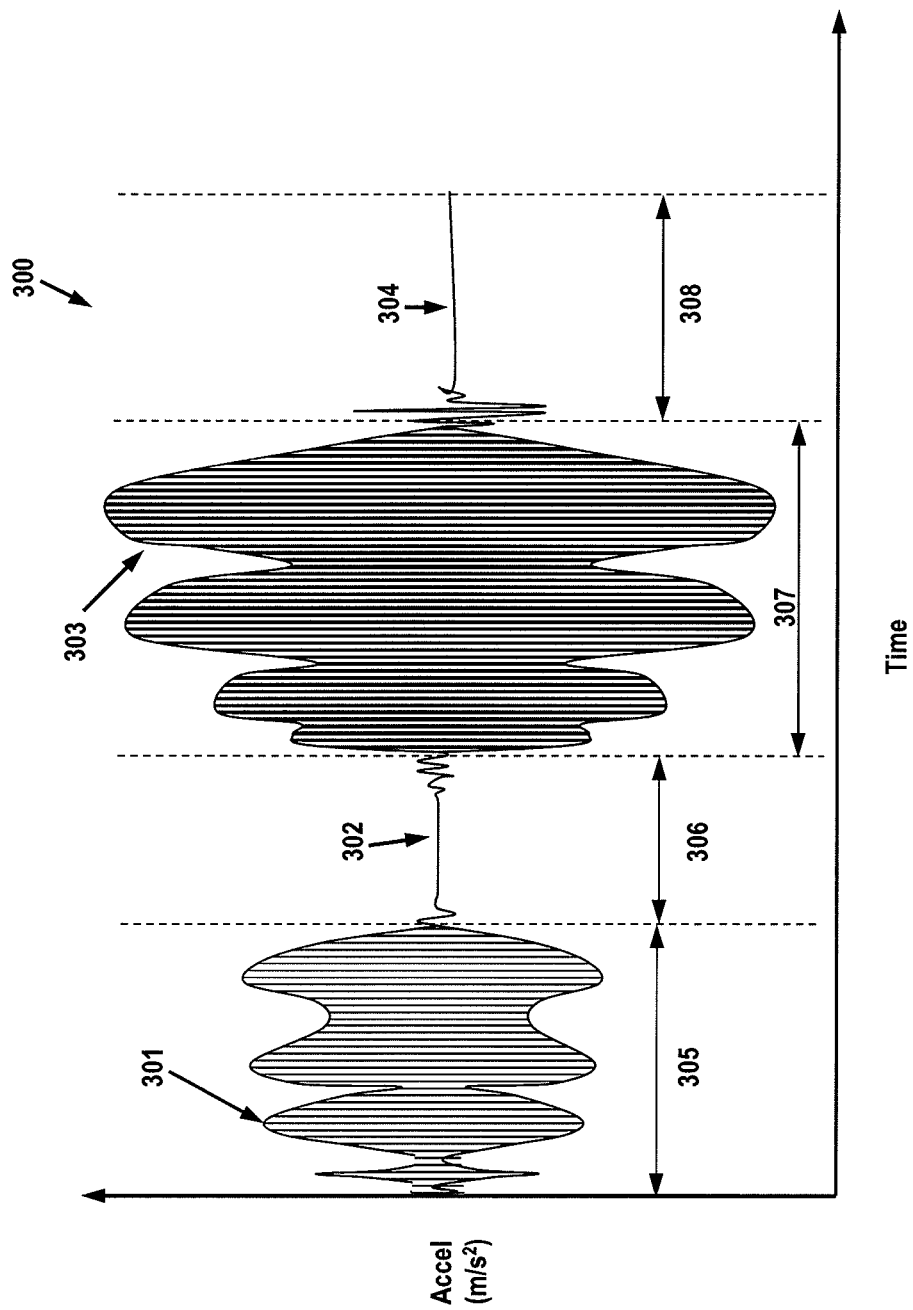
FIG. 3 is an exemplary graph illustrating accelerometer output data that may be used to register physical activity using time-based processing.

FIG. 3 illustrates a simplified exemplary capture of accelerometer data as a graphical depiction on a time-based scale. Signal 300 is segmented into four sections 205-308 defining boundaries of signal segment 301-304. In the example of FIG. 3, signal 301 exemplifies a user walking, signal 302 exemplifies a user stopping, signal 303 exemplifies a user running, and signal 302 exemplifies a user sitting. Depending on the sample rates and memory configuration used, each signal extending over a predetermined period of time is stored, along with each segment relating to the signal. Each signal and signal segment is preferably time-stamped. Under one embodiment, successive signal samples are overlapped by a predetermined period of time in order to account for segments that recorded an event (e.g., walking, laying down) that were "in between" predetermined time periods. Using the time stamps, the last segment in the period cut off by the predetermined time period can be combined and recreated with the first segment of the subsequent signal.

Figure 4:
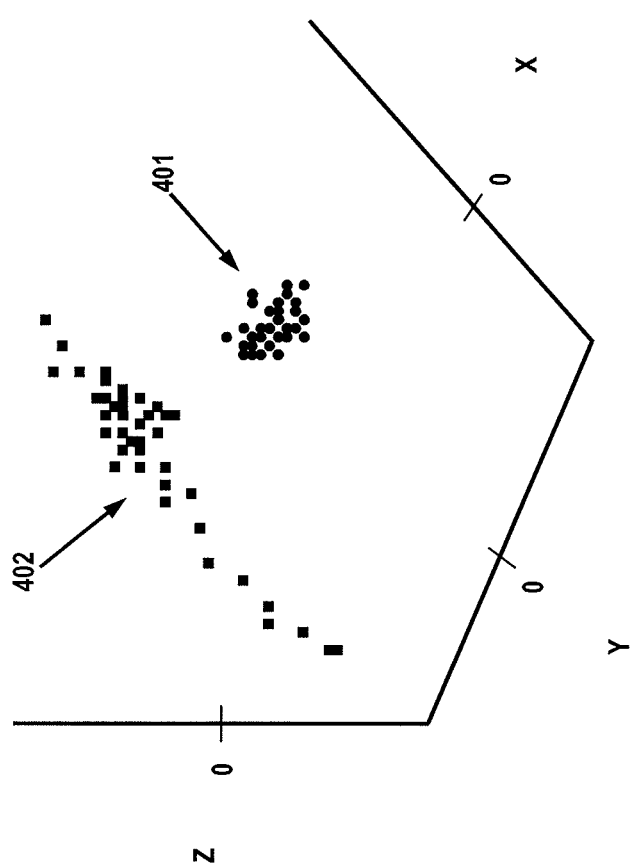
FIG. 4 is an exemplary graph illustrating accelerometer output data that may be used to register physical activity using frequency-based processing.

FIG. 4 illustrates a simplified exemplary capture of accelerometer data as a graphical depiction on a frequency-based scale. The example of FIG. 4 shows two data sets (401, 402) comprising frequency domain entropy measurements, where data set 401 would be representative of a user sitting, while data set 402 would be representative of a user standing/walking. It is understood that other measurements for FIG. 4 are suitable as well, depending on the features extracted (e.g., mean, standard deviation, correlation, etc.).

Figure 5:
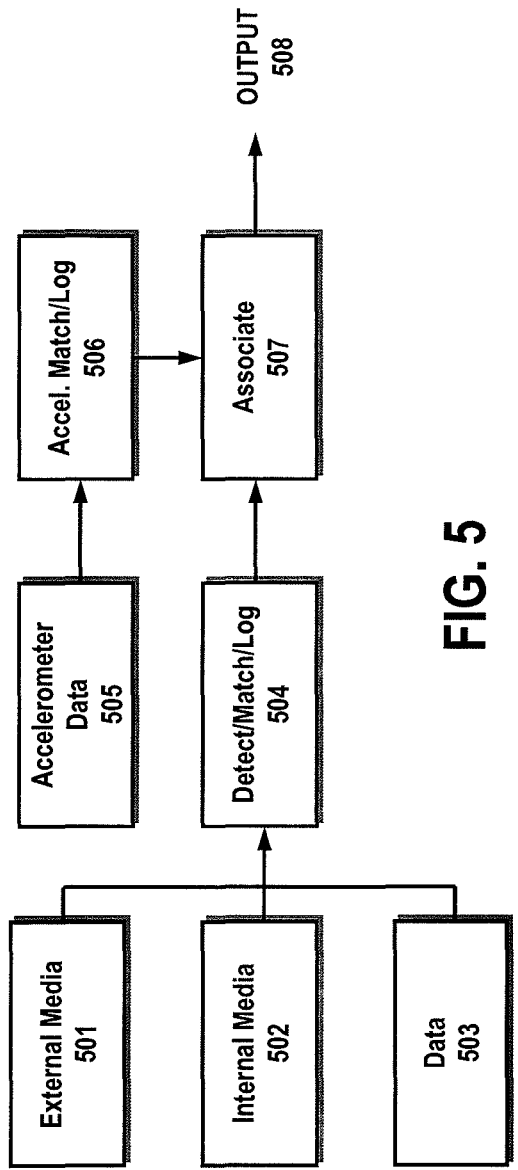
FIG. 5 illustrates an exemplary configuration for registering and converging accelerometer data with media exposure data.

FIG. 5 illustrates an embodiment where a portable processing device collects information regarding media exposure together with accelerometer data to generate a media session output 508. Exposure data relating to external media 501, internal media 502 and data 503 are collected and matched/logged in 504. For the purposes of this embodiment, "external media" refers to media that is generated from a source outside a portable device and is widely accessible, whether over-the-air, or via cable, satellite, network, internetwork (including the Internet), print, displayed, distributed on storage media, or by any other means or technique and that is humanly perceptible, with or without the aid of a machine or device, without regard to the form or content, and including but not limited to audio, video, audio/video, text, images, animations, databases, broadcasts, displays (including but not limited to video displays, posters and billboards), signs, signals, web pages, print media and streaming media data. "Internal media" refers generally to the same media as external media, except that the media is generated within a portable device and may include metadata. "Data" as it is used in reference 503 of FIG. 5 refers to operational data relating to an operating condition and/or status of a portable processing device, such as software applications that are opened/closed, communication status (e.g., WiFi, Bluetooth, wireless on/off) battery power, etc.

In 504, data pertaining external media 501 exposure is detected/matched in step 504. If the external media contains encoded ancillary codes, the media is decoded to detect the presence of the codes and the information pertaining to those codes (e.g., name of show, artist, song title, program, content provider ID, time of broadcast/multicast/narrowcast, etc.). If an audio and/or video signature is made from the incoming media, the signature is formed and stored on the device. Under one embodiment, the signature may be transmitted outside the device via a network to perform matching, where the match result is transmitted back to the portable device. Under an alternate embodiment, the signature may be compared and/or matched on the device itself. Operation-relating data 503 is also logged in 504. The detecting/matching/logging processes in 504 may be performed on a single processor (such as CPU 101 illustrated in FIG. 1), or may be performed on multiple processors as well. Results of 504 may then be stored in one or more memory devices (e.g., memory 108 of FIG. 1).

At the same time detecting/matching/logging processes are performed in 504, accelerometer data is matched and/or logged in process 506 to identify a specific user and/or physical activity determined from any of the techniques described above. The activity may then be authenticated by matching the accelerometer data with pre-stored accelerometer data in the user profile. The accelerometer-related data is then associated 507 with the media data from 504 to generate media exposure reports, exemplified in FIG. 5A. Here, an exemplary report is illustrated for a single user 510 ("1234"), where the type of media 511 and program information 512 is listed along with a start time 513 and end time 514 for the media session. Activity 515 classified from the accelerometer data is listed, along with an authentication result 516. Operational data, such as battery life 517, and application open 518 may also be listed.

As can be seen from FIG. 5A, multiple types of media may be recorded and associated with accelerometer data. In this example, during media session 519, user 1234 is registered as listening to "X Program" on radio station WABC between 08:45:32 AM and 08:49:32 AM, while in the sitting position. The accelerometer data for the user sitting matches the user's profile for that activity, and is thus listed as authenticated. Media session 520 still shows user 1234 as listening to WABC, but now is listening to the "Y Program" and the accelerometer data registers the user as walking. Again, the accelerometer data matches the user's profile and is authenticated. During media session 521, the user is watching the "Z Show" television program on Fox, and has authenticated accelerometer data indicating that the user is now standing.

During media session 522, the device is registered as going on an Internet site ("Fox.com"), and that the accelerometer data is indicative of a user that is sitting. In addition, media session stores application data 518, indicating that a browser ("Opera Mini") was opened and active during the session. Additional information may further be provided in the report with respect to application plug-ins and other software (e.g., media player) accessed in 518. In the example of session 522, the accelerometer data does not match an existing profile for the user, and is not authenticated. The failure to authenticate may happen for a number of reasons, such as the user sitting in an unusual place, such as the floor or a new chair, or because a different user is physically handling the portable computing device. Accordingly, the portable device stores the unauthenticated profile for future comparison and possible association with a new physical state for the user. If the association cannot subsequently be made, media session 522 may be flagged as "unauthenticated" and may be discounted (e.g., using statistical weighting) or alternately discarded for a media exposure report.

Continuing with FIG. 5A, media session 523 shows that the device has now gone to a new Internet site ("CNN.com"). However, the accelerometer data cannot be registered or authenticated as a recognized activity. In one embodiment, media sessions having unrecognized activities are simply stored as such, and are flagged and possibly discounted (e.g., using statistical weighting) or discarded for a media exposure report. By using probabilistic processing, unrecognized activities are preferably compared to recognized activities measured at one or more times before and/or after the unrecognized activity. If there is sufficient recognition and authentication in this time period, the anomalous accelerometer reading and media session is credited to the authenticated user. This technique is particularly advantageous when peculiar user habits or events (e.g., nervous bouncing of leg while sitting, eating while walking) distort accelerometer readings to a point where they are not recognizable. On the other hand, if there is insufficient recognition and authentication in this time period, the anomalous accelerometer reading and media session is discounted or discarded.

Figure 6:
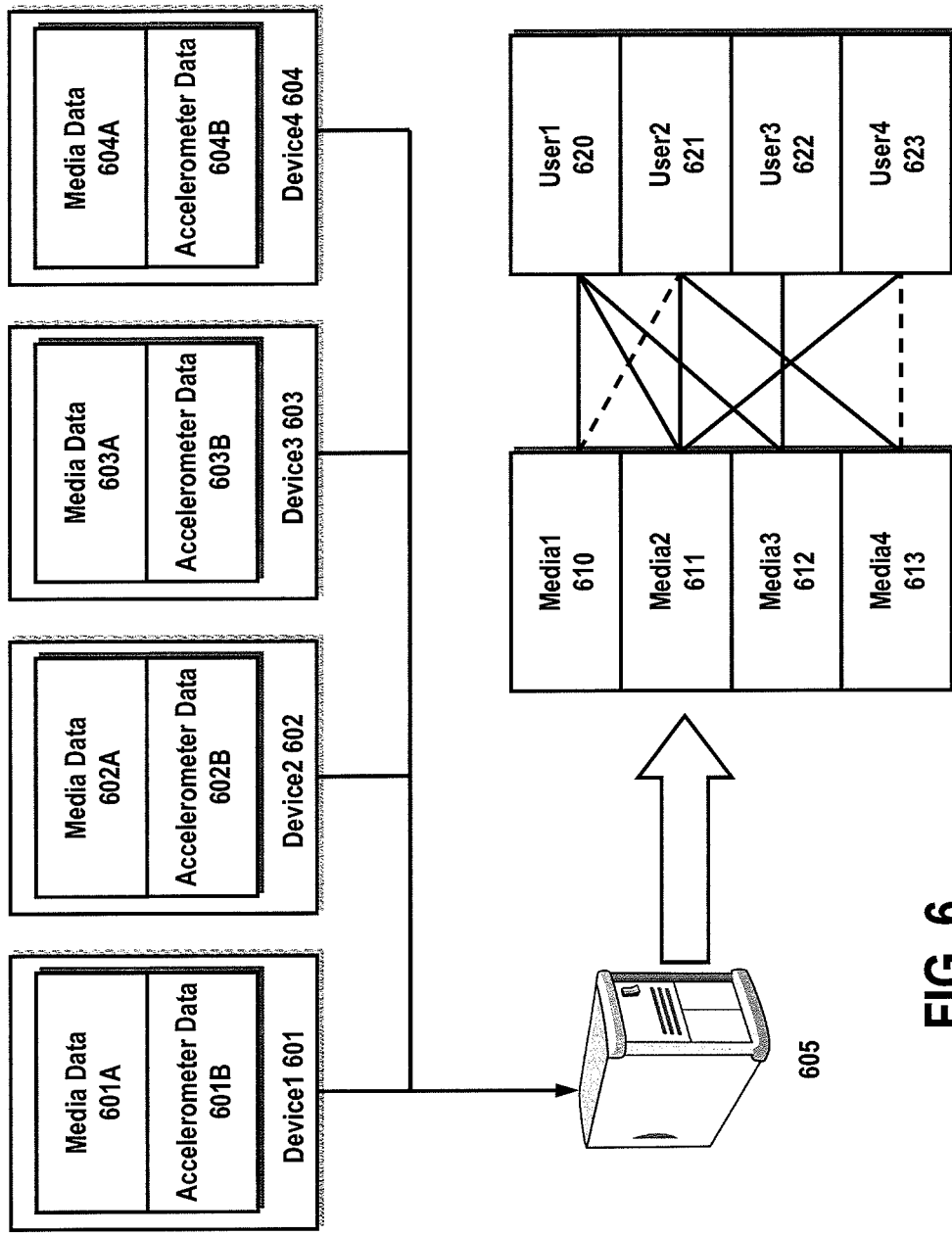
FIG. 6 is an exemplary embodiment for collecting accelerometer and media exposure data from multiple portable computing devices and matching users with specific media and physical activities.

Turning to FIG. 6, an embodiment is disclosed where media exposure data is received from multiple portable processing devices 601-604. Each portable processing device generates media data 601A-604A and accelerometer data 601B-604B using any of the techniques described above. Each of the devices 601-604 communicates this data using a computer, data or telephonic network (wired and/or wireless) to server(s) 605. Under one embodiment, the media detection, matching and/or logging (see 504, FIG. 5), accelerometer matching/logging (see 506, FIG. 5) and association (see 507, FIG. 5) are performed on server(s) 605. In another embodiment, these steps are performed on each of the respective portable devices. In yet another embodiment, some of these steps are performed on the devices, while other steps are performed on the server(s) 605.

The processed data in server 605 can be used as a basis for media exposure analysis. In the example of FIG. 6, four media items (610-613) are analyzed as to four users (620-623) that are associated with respective portable computing devices 601-604. Media items 610-613 may be any of internal and external media described above in connection with FIG. 5, along with portable computing device data. Utilizing accelerometer profiles and authentication, media exposure can be confirmed for each user. For example, User1 620 would be authenticated as been exposed to Medial 610, Media2 611 and Media3 612. User2 621 would be registered as authenticated with respect to Media2 611 and Media4 613, but unauthenticated with respect to Medial 610. User3 622 would be authenticated with respect to Media3 612, while User4 623 would be registered as authenticated with respect to Media2 611, but unauthenticated with respect to Media4 613.

Such a configuration opens up many possibilities regarding media exposure measurement for multiple associated users, such as families. By downloading a media measurement application enabled with accelerometer authentication, each user of a portable computing device in a family can register devices with each other, allowing accelerometer profiles to be shared or pushed to other devices in the family via data connections such as Ethernet, WiFi, Bluetooth, and the like. The sharing of accelerometer profiles enables media measurement companies to catch instances where one member in a family uses another family member's device. If the accelerometer data matches the shared profile in the other device, the user registered to the profile is correctly credited with being exposed to the media.

The accelerometer profiles may also be used to authenticate users on a more basic level through the use of prompts presented on a device. If a profile does not match on the device, modules may be configured to prompt the user with an identification question, such as "Are you [name]? The data does not match your stored accelerometer profile." Also, the accelerometer profiles can be configured to categorize anomalous activity that is not initially recognized by the device. For example, unrecognized accelerometer data may trigger a prompt asking the user what activity they are engaged in. The prompt may be in the form of a predetermined menu, or alternately allow a user to enter a textual description of the activity. The user's response to the prompt would then serve to create a new category of activity that would be added to the user's profile for subsequent comparison. The configurations described above provide a powerful tool for confirming identification and activity of users for audience measurement purposes.

Turning to FIG. 7, an exemplary table 700 is provided to illustrate how the embodiments described above may also be utilized to determine a probability that one or more of a plurality of users were exposed to a media event 701, such as the serving of a web page, playing of media, and the like. The media event may also be any of the external and/or internal media described above. Turning to FIG. 7, four users (User 1-User 4) are monitored for a specific time period (11:00-11:30). During the time period of 11:10 and 11:15, media event 701 is detected, where Users 1-4 are potential users that may have been exposed to the media event.

In the chart of FIG. 7, each user's accelerometer data is monitored prior to, and after, media event 701. For User 1, the accelerometer data indicates the user was engaging in a fast walk (FW) of from 11:00 to 11:05. Depending on the granularity of the accelerometer event data that is used, actions such as walking can be broken down into specific types, such as walking on level ground, walking up and/or down stairs, and so forth. The same can be done for actions like running, sitting (sitting upright, sitting in a reclined position) and/or laying (laying on back/side). For the example of FIG. 7, each action event is illustrated as having two types (types 1 and 2), although it is understood by those skilled in the art that a greater or lesser amount of types can be used depending on the sensitivity of the accelerometer and the available processing power available. In an additional embodiment, accelerometer data may be collected and processed to show a general level of activity (high/medium/low/none). In the example of FIG. 7, the level of activity is designated by bars where one bar designates low/no motion or activity, two bars designate medium motion, and three bars designate high motion. Again, the designations for levels of motion may have more than three bars or indicators, and may also be designated other ways, such as characters, color, or any other suitable indicia.

Turning back to User 1, the user is recorded as having a fast walk of one type (FW2) between 11:00 and 11:05. At 11:10, User 1 is engaged in a second type of fast walk (FW1), and subsequently sits (S1) between 11:15 and 11:20. At 11:25, User 1 changes sitting position (S2) and the returns back to the original sitting position (S1) at 11:30. Each of the activities for User 1 may also be compiled to show a general level of activity, where the fast walking (FW) and/or running (R) is designated as a high-motion activity (three bars), while sitting is designated as a low-motion activity (one bar). The monitoring of User 2 establishes that the user was sitting (S1) between 11:00 and 11:20, laid down in a first position (L1) at 11:25, then laid in a second position (L2) at 11:30. Each of these activities are registered as low-motion activities (one bar) throughout the duration of the time period.

The monitoring of User 3 establishes that the user was running (R2), and then slowed into a fast walk (FW1) at 11:00 and 11:05, respectively. User 3 then sat down (S1) for the duration of the media event (11:10-11:15), and subsequently engaged in a slow walk (SW1) at 11:20, and sat down (S1) between 11:25 and 11:30. Similarly to Users 1 and 2, User 3's high/medium/low motion activities are also recorded (shown as three, two and one bars, respectively). User 4 is monitored as running at 11:00, engaging in a slow walk at 11:05, sitting at 11:10, walking again from 11:15-11:25, then sitting at 11:30. Again, each of these activities are also recorded for high/medium/low motion.

When media exposure is monitored using any of the techniques described above, the motion activities illustrated in FIG. 7 may be processed concurrently, or separately using time stamps to correlate accelerometer events with media events. In the example of FIG. 7, a media event 701 is detected to have taken place from 11:10 to 11:15. As mentioned previously, the media event could the display of a web page, playing of media, receiving a broadcast, and the like. When correlating accelerometer data to media event 701, discreet blocks of time segments are processed to determine patterns of motion before and after media event 701. In the example of 700, the time blocks immediately preceding 701 and following 703 media event 701 are processed. For Users 1 and 4, it can be seen that various motion events were detected before, during and after media event 701, making them unlikely to have viewed the event. For Users 2 and 3 however, it can be seen that both were stationary during event 701. Both may be selected as potential users that were exposed to media event 701.

Under one embodiment, additional processing may be performed to determine user media exposure with a greater degree of accuracy. Accelerometer time segments may be chained together to determine overall motion patterns before, during and after the media event. Looking at User 2, it can be seen that the user was sitting with a low degree of motion throughout the entire period (11:05-11:20). However, User 3 was engaged in motion (FW1) prior to the media event, the transitioned to a low-motion state, the continued with motion (SW1) after the media event concluded. Using logic processing, it can be determined that User 3 was the most likely user exposed to the media event, since the transition to a low-motion state coincides with the media event, suggesting that User 3 moved purposefully to be exposed to media event 701.

It should be understood that the illustration of FIG. 7 is a simplified example and that other configurations are contemplated in this disclosure. For example, accelerometer data may be measured in gradations around the media event to determine the most likely user. Here, a first step would measure accelerometer data only within the time period of the media event, and remove users that do not meet predefined criteria (e.g., having a low-motion state). Next, the accelerometer data would be processed over a wider time period (e.g., one time segment before/after the media event) for the remaining users and remove users not meeting the criteria. The time periods could then be expanded incrementally (e.g., one time period at a time) until only one user remains. In the case where no users remain, the processing would revert back to the previous time segment and register all the remaining users (which may be 2 or more) as being exposed to the media event. Such processing techniques have the advantageous effect of streamlining the processing needed to accurately determine user media exposure.

In other embodiments, accelerometer data between two or more users can be compared to determine similarities in motion patterns. Such similarities may indicate that users were exposed to a media event together. Also, the processing may be configured so that the processing of the accelerometer data first uses the high/medium/low/none degrees of motion characterization to eliminate users, then process the specific motions (laying, sitting, standing, walking, running) to further narrow the potential users exposed to the media event. Also, multiple media events can be compared to each other to increase or decrease the probability that a user was exposed to a media event. Of course, as the complexity of analysis increases, techniques such as fuzzy logic and even probabilistic logic may be employed to establish patterns and probabilities under which user media exposure may be identified.

Figure 8:
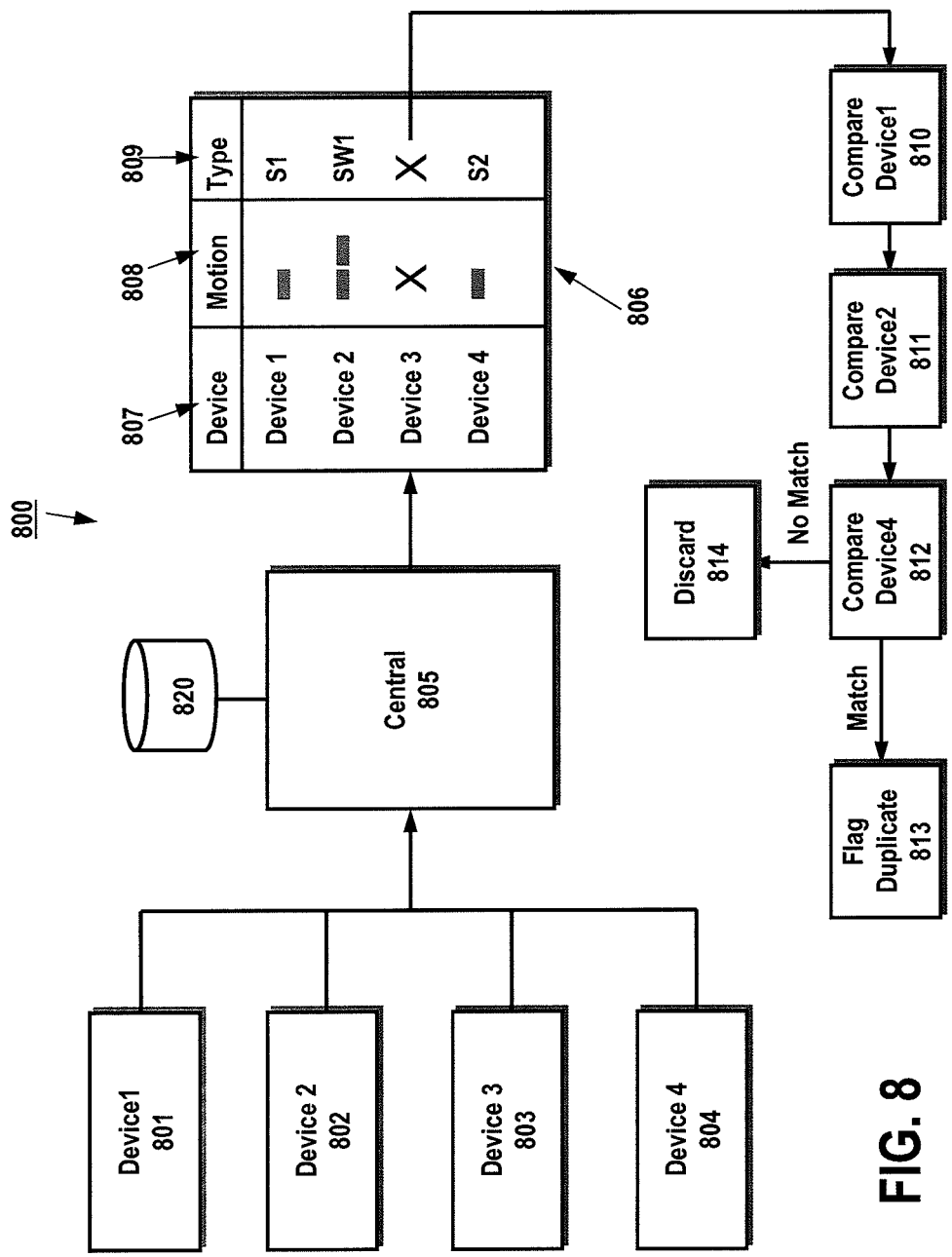
FIG. 8 is an exemplary configuration for determining portable device compliance and detecting multiple meters using accelerometer data.

FIG. 8 illustrates a system 800 configured to use accelerometer data, described above, to determine device usage. More specifically, system 800 may be advantageously configured to detect duplicate meter wearing by a specific user or panelist. In the example of FIG. 8, Devices 1-4 (801-804) generate and accelerometer data and transmit them wired or wirelessly to a central server 805, which may store the data as part of a global database 820, which may keep records of all users, devices, accelerometer profiles and the like. In one embodiment, devices 801-804 may be registered with the central server 805 in advance, so that each device 801-804 is associated with a specific individual, and all the associated individuals may be identified as belonging to a specific group (e.g., family, business, etc.). In this example, devices 801-804 are associated with a family, and the accelerometer data for all registered devices 801-804 is associated and stored in database 806.

For each device (Device 1-4) 807 in the example, a motion 808 and motion type 809 is determined in a manner similar to that disclosed above. Here, central server 805 determined that Device 1 (801) registered light/no motion, and that the user was sitting (type 1). Device 2 (802) registered medium motion and that the user was walking. Device 4 (804) also registered light/no motion, and that the user was sitting (type 2). Device 3 however, could not register a motion identifiable with a specific user profile, which may suggest that another user has possession of Device 3. As Devices 1-4 are registered to a common group, server 805 may process any unidentified accelerometer data by comparing that data to other members of the group. As explained in greater detail above, comparison processing may be performed using a comparison function is to compare feature vectors from accelerometer data and/or profiles, such as a distance metric function that defines distances between elements of a set. Suitable comparison metrics for this purpose include cross-correlation, absolute Manhattan distance, Euclidean distance, and/or DTW. If the results of comparison processing meet or exceed a predetermined threshold, a match is made. If a match cannot be made, the comparison processing can load a different profile to perform a new comparison. This process can repeat until a match is made.

In the example of FIG. 8, accelerometer data for Device 3 is compared against accelerometer data for Device 1 (810), Device 2 (811) and Device 4 (812). If no match is found, the accelerometer data is discarded 814. If, however, it is found that the accelerometer data for Device 3 matches another device, Device 3 is flagged as being a duplicate of another device. In other words, the flag would indicate that the device's accelerometer data matches the accelerometer data and/or profile of another user, indicating that one user is in possession of multiple devices.

In the embodiment described above, accelerometer data from Device 3 may be compared to the matched accelerometer profiles of the other devices that in turn identified motion 808 and motion type 809. In another embodiment, accelerometer data from Device 3 may be compared directly to the accelerometer data received during a specific time period for the other devices in the group. Such a configuration may be advantageous where multiple devices do not register motion identifiable with a specific user profile. Continuing with the example of FIG. 8, if Device 2 (802) and Device 3 (803) do not register motion identifiable with a specific user profile, this may be due to the fact that that specific motion occurred that was not previously registered for that user during a training process. In this case, directly comparing time-stamped accelerometer data for a given time period would be relatively straightforward under the present disclosure, provided that the number of devices in a group are not unreasonably large. If the accelerometer data for Device 2 and Device 3 matches (i.e., is similar within a predetermined threshold), it can be determined that these devices are in the physical possession of the same user, despite the fact that specific accelerometer profiles were not previously available for the particular motion. In addition, directly comparing time-stamped accelerometer data for a given time period may be advantageous in cases where a user outside the group is carrying multiple devices. In this example, if Device 2 (802) and Device 3 (803) do not register motion identifiable with a specific user profile, this may be due to the fact that an unregistered person, or a person outside the group, is physically possessing multiple devices. It can be appreciated by those skilled in the art that the accelerometer data has a wide variety of applications for determining portable device usage.

Figure 9:
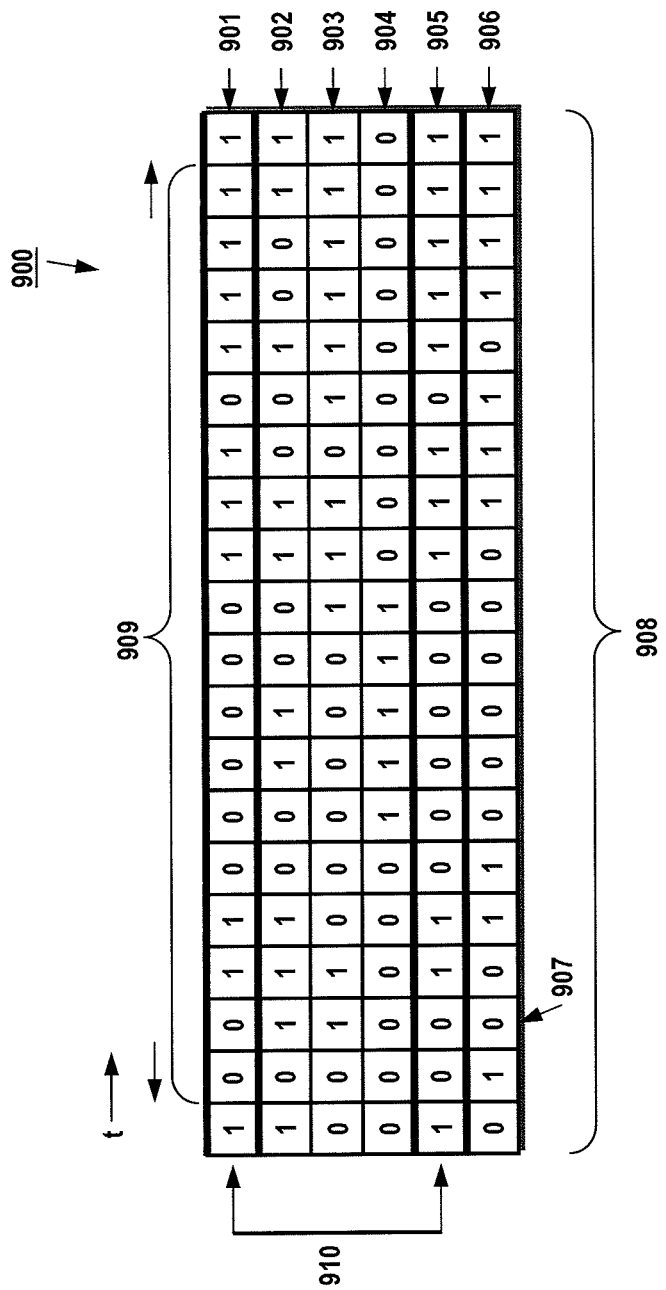
FIG. 9 illustrates an exemplary embodiment where gross motion correlation is performed to determine matching accelerometer data.

When motion detection monitoring is required for large amounts of users, it is possible to use gross motion data over a span of time to determine duplicate meters. In the embodiment of FIG. 9, instead of using specific accelerometer readings, gross motion estimations are obtained for each device. For gross motion estimation, accelerometer motion is measured in short periods of time (e.g., 5, 10, 30 seconds) and aggregated over a longer period of time (e.g., 1, 5, 10 minutes, 1-4 hours, etc.) and transmitted remotely. For each short time period, a minimum motion threshold is set on the device. If the motion exceeds the threshold, a "1" is assigned for that time period. If motion does not exceed the threshold, a "0" is assigned for the time period. Accordingly, a series of 0's and 1's are generated for a longer time period, as shown in FIG. 9.

Here, an exemplary motion matrix 900 is provided, where gross motion strings are shown for devices 901-906. Each string is comprised of values for each short time period 907, spanning over long time period 908. Accordingly, each string may act as a "fingerprint" for motion over a specific period of time. As such, each gross motion fingerprint may act to distinguish devices/users over discrete periods of time. As can be seen from FIG. 9, the gross motion fingerprint for devices 901 and 905 are an exact match, which strongly suggests that the same user was carrying both devices. Of course, exact matches are not necessarily required for this determination. Specific tolerance thresholds may be implemented for gross motion fingerprint matching (e.g., 80%, 90% match, etc.) as well.

Additionally, the matching process may employ data shifting techniques to compare sub-strings to other sub-strings. For example, sub-string 909 of device 901 may be shifted one block to the left or right and compared to other sub-strings of matrix 900. As can be seen from FIG. 9, gross motion string for device 901 would not match the string for device 903. However, if sub-string 909 is shifted on place to the left, a match may be found between device 901 and 903. Similarly, if sub-string 909 is shifted one place to the right, a match may be found between device 901 and 906. Furthermore, accelerometer data may be time-averaged to reduce noise.

It is understood that the techniques disclosed herein are not strictly limited to accelerometers, but may be applied across a wide varieties of motion-sensing technologies, including magnetic sensors and magnetometers, and even optical and infrared sensors for certain embodiments.

It is understood from the above that the term module as used herein does not limit the functionality to particular physical modules, but may include any number of software components. In general, a computer program product in accordance with one embodiment comprises a computer usable medium (e.g., standard RAM, an optical disc, a USB drive, or the like) having computer-readable program code embodied therein, wherein the computer-readable program code is adapted to be executed by processor 102 (working in connection with an operating system) to implement a method as described above. In this regard, the program code may be implemented in any desired language, and may be implemented as machine code, assembly code, byte code, interpretable source code or the like (e.g., via C, C++, C #, Java, Actionscript, Objective-C, Javascript, CSS, XML, etc.).

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

What is claimed is:

1. A system for detecting multiple portable computing devices being physically carried by one person, the system comprising:
   an input to receive media exposure data from a first one of a plurality of portable computing devices;
   the input to receive segmented accelerometer data from the plurality of portable computing devices, the segmented accelerometer data segmented based on accelerometer data associated with at least one of walking, stopping, running, or sitting;
   a processor, operatively coupled to the input, to extract features from the segmented accelerometer data, the processor forming accelerometer classification data for respective ones of the plurality of portable computing devices based on the extracted features;
   the processor to compare the accelerometer classification data for the first portable computing device to at least one of (i) the accelerometer classification data for respective ones of the plurality of portable computing devices and (ii) stored accelerometer classification data for respective ones of the plurality of portable computing devices, to determine if accelerometer classification data for the first portable computing device is sufficiently similar to a second one of the plurality of portable computing devices;
   the processor to identify the first portable computing device and the second portable computing device as being physically carried by a same person when the comparison determines that the accelerometer classification data for the first portable computing device is sufficiently similar to the accelerometer classification data for the second portable computing device; and
   in response to identifying the first and second portable computing devices as being carried by the same person, the processor to credit the media exposure data for one of the first portable computing device or the second portable computing device, thereby reducing inaccurate media measurement results.

2. The system of claim 1, wherein the media exposure data comprises at least one of (i) ancillary codes detected from audio, (ii) one or more signatures extracted from audio, (iii) a web page, (iv) application data, and (v) metadata.

3. The system of claim 1, wherein the plurality of portable computing devices are associated with a group.

4. The system of claim 1, wherein the accelerometer classification data and stored accelerometer classification data comprise raw accelerometer data processed in one of a time domain and a frequency domain.

5. The system of claim 1, wherein the comparison of the accelerometer classification data for the first portable computing device to the accelerometer classification data for respective ones of the plurality of computing devices is based on one of (1) cross-correlation, (2) absolute Manhattan distance, (3) Euclidean distance, and (4) dynamic time warping.

6. The system of claim 1, wherein the accelerometer classification data for the first portable computing device is sufficiently similar when the similarity is above a predetermined threshold.

7. A method for detecting multiple portable computing devices being physically carried by one person, the method comprising:
  receiving, by executing an instruction with a processor, media exposure data from a first one of a plurality of portable computing devices;
  receiving, by executing an instruction with the processor, segmented accelerometer data from the plurality of portable computing devices, the segmented accelerometer data segmented based on accelerometer data associated with at least one of walking, stopping, running, or sitting;
  extracting, by executing an instruction with the processor, features from the segmented accelerometer data and forming accelerometer classification data for respective ones of the plurality of portable computing devices based on the extracted features;
  comparing, by executing an instruction with the processor, the accelerometer classification data for the first portable computing device to at least one of (i) the accelerometer classification data for respective ones of the plurality of portable computing devices and (ii) stored accelerometer classification data for respective ones of the plurality of portable computing devices, to determine if accelerometer classification data for the first portable computing device is sufficiently similar to a second one of the plurality of portable computing devices;
  identifying, by executing an instruction with the processor, the first portable computing device and the second portable computing device as being physically carried by a same person when the comparison determines that the accelerometer classification data for the first portable computing device is sufficiently similar to the accelerometer classification data for the second portable computing device; and
  in response to identifying the first and second portable computing devices as being carried by the same person, crediting, by executing an instruction with the processor, the media exposure data for one of the first portable computing device or the second portable computing device, thereby reducing inaccurate media measurement results.

8. The method of claim 7, wherein the media exposure data comprises at least one of (i) ancillary codes detected from audio, (ii) one or more signatures extracted from audio, (iii) a web page, (iv) application data, and (v) metadata.

9. The method of claim 7, wherein the plurality of portable computing devices are associated with a group.

10. The method of claim 7, wherein the accelerometer classification data and stored accelerometer classification data comprise raw accelerometer data processed in one of a time domain and a frequency domain.

11. The method of claim 7, wherein the comparison of the accelerometer classification data for the first portable computing device to the accelerometer classification data for respective ones of the plurality of computing devices is based on one of (1) cross-correlation, (2) absolute Manhattan distance, (3) Euclidean distance, and (4) dynamic time warping.

12. The method of claim 7, wherein the accelerometer classification data for the first portable computing device is sufficiently similar when the similarity is above a predetermined threshold.

13. A computer readable storage device comprising computer readable instructions which, when executed, cause a processor to at least:
  receive media exposure data from a first one of a plurality of portable computing devices;
  receive segmented accelerometer data from the plurality of portable computing devices, the segmented accelerometer data segmented based on accelerometer data associated with at least one of walking, stopping, running, or sitting;
  extract features from the segmented accelerometer data and form accelerometer classification data for respective ones of the plurality of portable computing devices based on the extracted features;
  compare the accelerometer classification data for the first portable computing device to at least one of (i) the accelerometer classification data for respective ones of the plurality of portable computing devices and (ii) stored accelerometer classification data for respective ones of the plurality of portable computing devices, to determine if accelerometer classification data for the first portable computing device is sufficiently similar to a second one of the plurality of portable computing devices;
  identify the first portable computing device and the second portable computing device as being physically carried by a same person when the comparison determines that the accelerometer classification data for the first portable computing device is sufficiently similar to the accelerometer classification data for the second portable computing device; and
  in response to identifying the first and second portable computing devices as being carried by the same person, credit the media exposure data for one of the first portable computing device or the second portable computing device, thereby reducing inaccurate media measurement results.

14. The storage device of claim 13, wherein the media exposure data comprises at least one of (i) ancillary codes detected from audio, (ii) one or more signatures extracted from audio, (iii) a web page, (iv) application data, and (v) metadata.

15. The storage device of claim 13, wherein the accelerometer classification data and stored accelerometer classification data comprise raw accelerometer data processed in one of a time domain and a frequency domain.

16. The storage device of claim 13, wherein the comparison of the accelerometer classification data for the first portable computing device to the accelerometer classification data for respective ones of the plurality of computing devices is based on one of (1) cross-correlation, (2) absolute Manhattan distance, (3) Euclidean distance, and (4) dynamic time warping.

17. The storage device of claim 13, wherein the accelerometer classification data for the first portable computing device is sufficiently similar when the similarity is above a predetermined threshold.

* * * * *